Nov. 29, 1966  B. DA VALLE  3,287,850
PERFORATED PLASTIC FILM
Original Filed Sept. 4, 1959  2 Sheets-Sheet 1
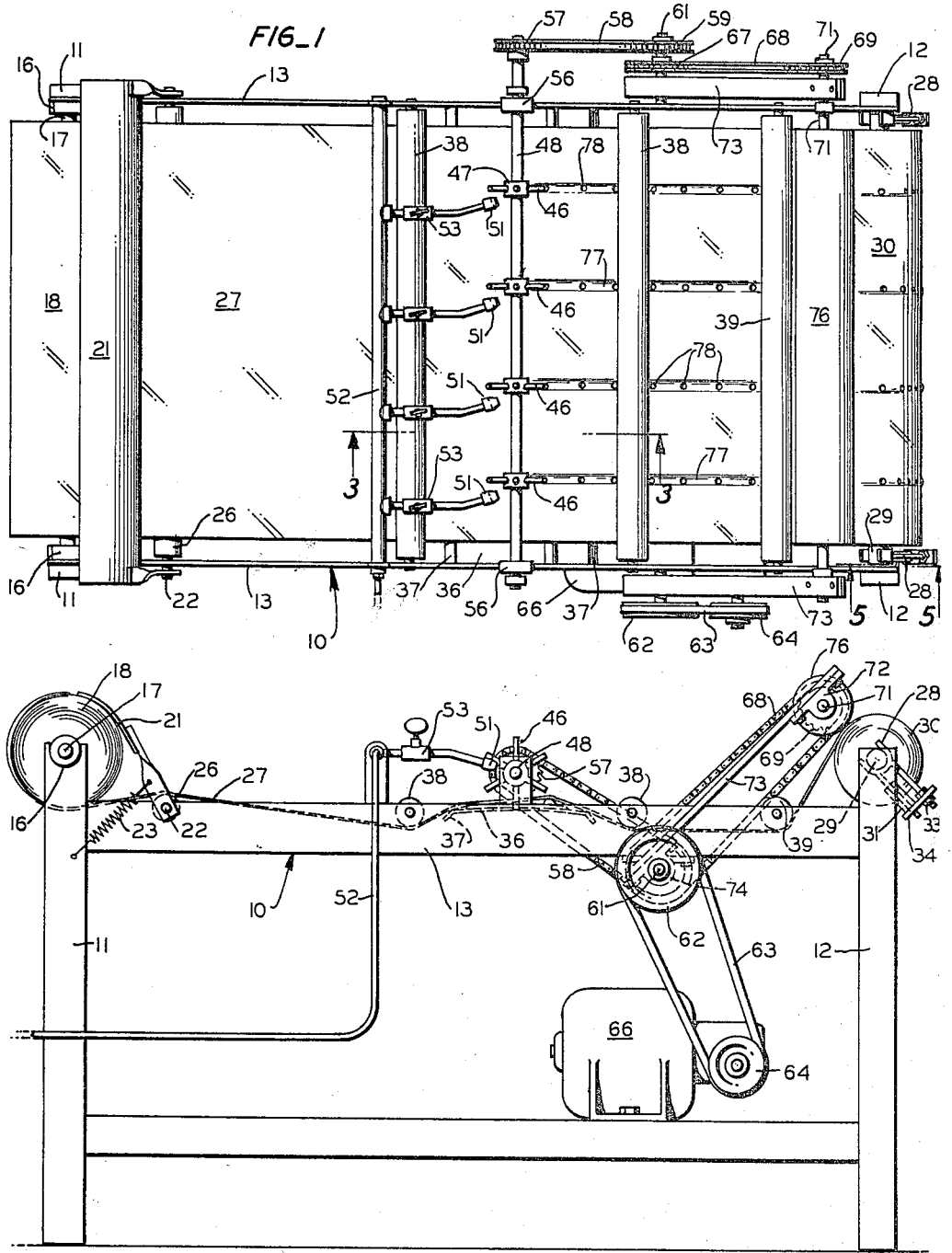
FIG_1
FIG_2
INVENTOR.
Bruno Da Valle
BY Allen and Chromy
ATTORNEYS Nov. 29, 1966    B. DA VALLE    3,287,850
PERFORATED PLASTIC FILM
Original Filed Sept. 4, 1959    2 Sheets-Sheet 2
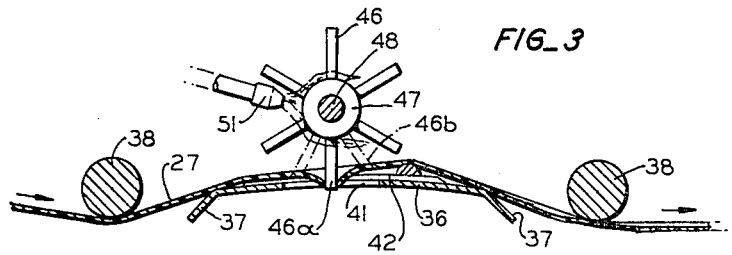
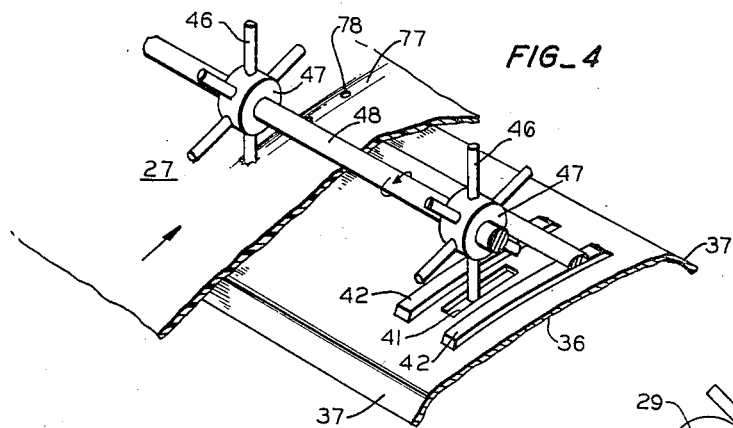
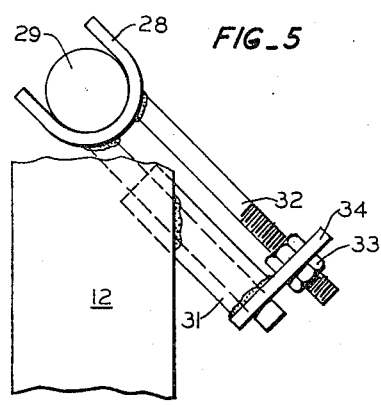
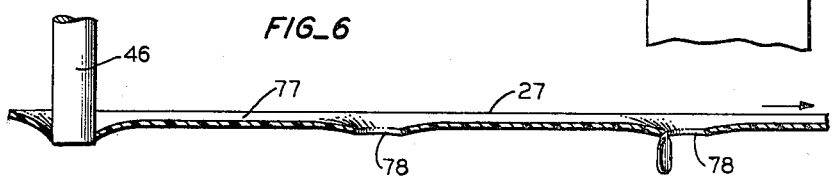
INVENTOR.
Bruno Da Valle
BY
Allen and Chromy
ATTORNEYS

3,287,850
PERFORATED PLASTIC FILM
Bruno Da Valle, 15951 Quail Hill Road, Los Gatos, Calif.
Original application Sept. 4, 1959, Ser. No. 838,305, now Patent No. 3,146,283, dated Aug. 25, 1964. Divided and this application Jan. 20, 1964, Ser. No. 338,893
1 Claim. (Cl. 47—9)

The present invention relates to plastic film and is concerned more particularly with the provision of perforated polyethylene film of the type adapted for agricultural use to provide an opening in the film for planting and to cover the ground around the plant for control of weeds and for moisture retention.

This application is a division of my co-pending application Serial No. 838,305, filed September 4, 1959, for Perforating Plastic Film and the Like and the Product Thereof, now Patent Number 3,146,283, dated August 25, 1964.

It is a general object of the invention to provide a perforated plastic film of special construction for agricultural uses.

Another object of the invention is to provide a perforated plastic film which is useful in handling the water applied to the plants.

Other objects and advantages of the invention will be apparent from the following description of certain preferred embodiments thereof, taken in conjunction with the accompanying drawings, in which:

FIGURE 1 is a plan view of apparatus for perforating plastic film;

FIGURE 2 is a side elevational view of the apparatus shown in FIGURE 1;

FIGURE 3 is a fragmentary sectional view of the apparatus taken in a plane indicated by the line 3—3 in FIGURE 1;

FIGURE 4 is a perspective view of the perforating means in cooperation with the plastic film, certain parts being broken away to illustrate the details of construction;

FIGURE 5 is a fragmentary elevational view taken as indicated by the line 5—5 in FIGURE 1;

FIGURE 6 is a sectional view of the plastic film taken in a plane extending along the length of the film.

Referring to FIGURES 1 and 2, the perforating and grooving apparatus C of the instant invention comprises a frame 10 having respective corner posts 11 and 12 and having respective side rails 13 joined thereto. Suitable cross members, bottom rails, etc., are also included in the frame 10.

It is preferred to employ a low density polyethylene film having a carbon black content such as the film marketed under the trade name "Visqueen" by the Visking Company, a division of Union Carbide Corporation. Other nonflammable plastic films may also be employed, such as saran, a vinylidene chloride/vinyl chloride, produced by the Dow Chemical Company. Means is provided for supporting a roll of polyethylene film which is to be treated, and this means comprises grooved seats 16 (FIGS. 1 and 2) in the top of the posts 11, into which the shaft 17 of a roll 18 can be dropped, thereby journaling the roll for withdrawal of the film on the roll. A frictional retainer is provided for the roll in the form of a curved presser arm 21 pivotally mounted on a shaft 22 on the frame, and each urged by a spring 23 to engage the roll 18. The pivot means 22 for these levers 21 carries a support or idler roll 26 over which the film 27 passes.

Adjacent the posts 12, there is provided a pair of U-shaped journal elements 28 (FIGS. 1, 2 and 5) secured on the respective posts 12 and forming sockets for receiving the shaft 29 of the take-up roll 30 for the polyethylene film after treating. As shown in FIG. 5, each U-shaped journal element 28 is mounted for adjusting movement by its sliding support in a sleeve 31 on the frame, and by its screw extension 32 which is secured in the desired place for alignment of the rolls by means of nuts 33 engaging on opposite sides of a plate 34 secured to the sleeve 31.

Intermediate the feed roll 18 and the take-up roll 30, there is provided means for treatment of the polyethylene film in the form of perforating and grooving means, and this treating means includes generally a transverse plate 36, which extends between the side rails 13 and is formed slightly convex on its upper surface with downturned side edges 37. At either side of the plate 36 (FIG. 2) rotatable guide rolls 38 are provided extending between the side rails 13 and adapted to be positioned over the film 27 to maintain it in tight engagement with the plate 36. A fourth guide roll 39 is provided adjacent to the take-up roll 30.

As seen in FIG. 4, plate 36 is provided with a series of slots 41 extending in the direction of travel of the film, and each positioned between respective raised ribs 42 also extending in this direction so that a film forming pocket is provided. Cooperating with the grooves 41 are respective sets of spokes or projecting perforating elements 46, equally spaced and projecting radially outwardly from a hub 47 secured on a transverse shaft 48. The number of the spokes 46 is selected in accordance with the required spacing of the perforations to be made in the film, and the shaft 48 is driven at a speed to cause the spokes to travel during the lower part of their path in the same direction and at substantially the same velocity as the travel of a sheet of film, as will later be described.

Heating means are provided for the perforating elements 46 to enable them to melt or burn their way through the polyethylene film and this heating means takes the form of a series of nozzles 51 (FIG. 1) carried by a gas supply pipe 52 and having respective shut-off valves 53. The nozzles 51 are positioned to eject a flame directly onto the spokes or pins 46 and to maintain them at a desired temperature for perforation of the film and for forming of the groove therein.

The shaft 48 (FIGS. 1 and 2) is supported by suitable bearings 56 on the side rails 13, and carries at one end a sprocket wheel 57 connected by a chain 58 with another sprocket wheel 59 on a counter shaft 61. The counter shaft 61 carries a pulley 62 connected by a belt 63 with a drive pulley 64 of a motor 66. The counter shaft 61 also carries a second sprocket wheel 67 (FIG. 1) connected by a chain 68 with a sprocket wheel 69 on a transverse shaft 71 supported in suitable bearings 72 carried by respective arms 73 pivotally secured by bearings 74 about the counter shaft 61. The shaft 71 carries a drive roll 76 which engages the periphery of the take-up roll 30 of polyethylene film so that a constant speed drive is applied to the roll of film irrespective of its diameter, and the gear ratio between the various sprockets and drive rollers, is selected so that the drive roll 76 has a peripheral speed which is identical with the peripheral speed of the perforating spokes on pins 46, the diameter of the roll 76 being substantially equal to the effective diameter of opposite pins 46 in the perforating position.

As previously explained, the number of perforating elements or pins 46 provided in each perforating wheel is selected in accordance with the desired spacing of the perforations longitudinally of the strip of film, and the number of perforating wheels transversely of the strip is selected in accordance with the desired transverse hole spacing.

Referring particularly to FIG. 3, it will be appreciated that as the hot perforating pin shown at 46a in FIG. 3 approaches the polyethylene film the heat will begin to deform the film into a groove 77, and as the film is dragged down into the slot 41, this groove will be formed. Also at the exact point of engagement of the projecting perforating pin 46 with the film, a hole 78 will be melted therethrough, the groove forming operation on the film continuing as this pin proceeds from its full line position, to its dotted line position 46b. The particular temperature of the perforating pins 46 is not important except that it should be at or slightly above the melting point of the film being treated, so as to provide an effective perforating action. It will be noted that the holes or perforations are defined by heat-deformed edges.

After the perforating and grooving of the film as shown, it is used in argriculture, for example in the planting of roses, by being spread upon the ground after the ground has been prepared, and the rose slips pressed into the ground through the apertures 78 in the film 27. The film 27 then is left on the ground, being weighted at the edges with dirt or rocks, for weed control and for moisture control. Where overhead irrigation is employed as, for example, by sprinklers, the provision of the groove 77 extending in the line of the perforations 78 provides a natural drain trough for the water to travel to these perforations and into the ground immediately around the plants.

While I have shown and described a preferred embodiment of the invention, it will be apparent that the invention is capable of variation and modification within the proper scope of the claims appended hereto.

I claim:

A roll of polyethylene film in strip form having a parallel array of longitudinal grooves therein disposed parallel to the edges of the strip and being heat deformed from the plane of the strip, and spaced perforations in each of said grooves, said perforations having heat deformed edges.

References Cited by the Examiner
UNITED STATES PATENTS
2,822,644  2/1958  Berger _____ 47—32

OTHER REFERENCES

"Strawberry Culture Easy With Plastic Mulch," The Sunday Star, Washington, D.C., Mar. 31, 1957, p. C–13.

ABRAHAM G. STONE, *Primary Examiner.*

R. E. BAGWILL, *Assistant Examiner.*